US011635207B2

(12) United States Patent
Williams et al.

(10) Patent No.: US 11,635,207 B2
(45) Date of Patent: Apr. 25, 2023

(54) ELECTRIC IGNITION FOR FLASHPOINT TESTER

(71) Applicant: Anton Paar ProveTec GmbH, Blankenfelde-Mahlow (DE)

(72) Inventors: Benjamin Williams, Werder Havel (DE); Florian Strasser, Berlin (DE); Xenia Tuaev, Berlin (DE)

(73) Assignee: Anton Paar ProveTec GmbH, Blankenfelde-Mahlow (DE)

( * ) Notice: Subject to any disclaimer, the term of this patent is extended or adjusted under 35 U.S.C. 154(b) by 746 days.

(21) Appl. No.: 16/573,647

(22) Filed: Sep. 17, 2019

(65) Prior Publication Data

US 2020/0096198 A1 Mar. 26, 2020

(30) Foreign Application Priority Data

Sep. 20, 2018 (DE) ...................... 10 2018 123 097.4

(51) Int. Cl.
*F23Q 2/28* (2006.01)
*G01N 25/28* (2006.01)
*G01N 25/52* (2006.01)
*F23Q 7/14* (2006.01)

(52) U.S. Cl.
CPC ............... *F23Q 2/28* (2013.01); *F23Q 7/14* (2013.01); *G01N 25/28* (2013.01); *G01N 25/52* (2013.01)

(58) Field of Classification Search
CPC ... F23Q 2/28; F23Q 2/282; F23Q 7/14; F23Q 6/006; G01N 25/28; G01N 25/22; G01N 25/52
USPC .................................................. 431/260, 263
See application file for complete search history.

(56) References Cited

U.S. PATENT DOCUMENTS

| 245,568 | A | * | 8/1881 | Saybolt | ................... G01N 25/52 |
| | | | | | 73/36 |
| 2,170,056 | A | | 8/1939 | Keinath et al. | |
| 3,051,862 | A | * | 8/1962 | Hoff | ....................... F23Q 3/006 |
| | | | | | 313/146 |
| 3,340,718 | A | * | 9/1967 | Heisler | ................... B21K 23/00 |
| | | | | | 313/631 |
| 3,913,600 | A | | 10/1975 | Cox | |
| 5,176,449 | A | | 1/1993 | Grabner | |

(Continued)

FOREIGN PATENT DOCUMENTS

| CN | 105445325 A | * | 3/2016 | ............. G01N 25/52 |
| CN | 106483164 A | * | 3/2017 | ............. G01N 25/52 |

(Continued)

OTHER PUBLICATIONS

"DE_25185_C_I—Machine Translation.pdf", Machine Translation, EPO.org, May 23, 2022 (Year: 2022).*

(Continued)

*Primary Examiner* — Steven B McAllister
*Assistant Examiner* — Daniel E. Namay
(74) *Attorney, Agent, or Firm* — Robert A. Blaha; Smith Tempel Blaha LLC

(57) ABSTRACT

A device for igniting a sample arranged in a container for a flashpoint determination test and/or a combustion point determination test. The device has an electric igniter, which has an ignition tip having a partially or completely encapsulated electric wire; and a traversing device, which is configured for traversing the ignition tip of the electric igniter to a defined position within the container.

20 Claims, 5 Drawing Sheets

(56) References Cited

U.S. PATENT DOCUMENTS

| | | | |
|---|---|---|---|
| 5,834,630 A | 11/1998 | Fukushi | |
| 5,869,343 A * | 2/1999 | Handschuck | G01N 25/52 73/36 |
| 2009/0297998 A1* | 12/2009 | Offredi | F23Q 3/006 431/258 |
| 2022/0349849 A1* | 11/2022 | Strasser | G01N 25/52 |

FOREIGN PATENT DOCUMENTS

| | | | | |
|---|---|---|---|---|
| CN | 107328816 A | * | 11/2017 | G01N 25/52 |
| CN | 206788082 U | | 12/2017 | |
| CN | 105445325 B | * | 5/2019 | G01N 25/52 |
| CS | 251137 B1 | * | 6/1987 | G01N 25/18 |
| DE | 25185 C | | 12/1883 | |
| DE | 552 706 C | | 6/1932 | |
| DE | 747366 C | | 9/1944 | |
| DE | 1 598 631 A1 | | 10/1970 | |
| DE | 10206021 A1 | | 9/2003 | |
| DE | 10206021 B4 | * | 10/2004 | G01N 25/52 |
| DE | 102016223716 A1 | * | 5/2018 | F02M 51/005 |
| GB | 185814 A | * | 9/1922 | G01N 25/52 |
| GB | 185814 A | | 9/1922 | |
| GB | 753665 A | * | 1/1954 | G01N 25/52 |
| GB | 1 257 323 A | | 12/1971 | |
| GB | 1 279 396 A | | 6/1972 | |
| JP | 05172771 A | * | 7/1993 | G01N 25/52 |
| JP | 10002869 A | * | 1/1998 | G01N 25/52 |
| JP | 3605965 B2 | * | 12/2004 | F02D 35/021 |

OTHER PUBLICATIONS

"DE_747366_C_—Machine Translation.pdf", Machine Translation, EPO.org, May 23, 2022 (Year: 2022).*

"DE_10206021_A1_I—Machine Translation", Machine Translation, EPO.org, May 23, 2022 (Year: 2022).*

Extended European Search Report in Application 19197925.1; dated Mar. 10, 2020; pp. 1-7; European Patent Office, 80298; Munich, Germany.

Pill, T.; Office Action in Application No. 10 2018 123 097.4; pp. 1-5; dated Jan. 29, 2021; German Patent and Trademark Office; Zweibrüchenstraße 12, 80331, Munich.

* cited by examiner

ELECTRIC IGNITION FOR FLASHPOINT TESTER

CROSS-REFERENCE TO RELATED APPLICATIONS

The present application is a national phase application derived from, and claiming the benefit of the filing date of, the German Patent Application DE 10 2018 123 097.4, filed Sep. 20, 2018, which is incorporated herein by reference in its entirety.

TECHNICAL FIELD

The present invention relates to a device for igniting a sample arranged in a container for a flashpoint determination test, further relates to a system for a flashpoint determination, and still further relates to a method of igniting of a sample arranged in a container during a flashpoint determination test.

TECHNOLOGICAL BACKGROUND

Flashpoint test systems are conventionally used for the characterization of combustible materials (e.g. diesel, petrol, kerosene, heating oil), dissolvents, lubricating oils, or chemicals. Per definition, the flashpoint is the lowest temperature, at which vapors (gaseous sample mixed with air) develop under fixed conditions from the liquid to be tested in an open or closed receptacle or crucible in such a quantity that a sample-gas-air-mixture that is flammable by extraneous ignition develops within or outside of the container.

For the determination of the flashpoint and/or the combustion point, preferably according to different standards, a defined quantity of a sample (substance) to be investigated is filled into the container (e.g. measurement crucible), heated in a controlled manner (in particular brought to a predetermined temperature), and stirred if required. Thereby, a mixture of liquid and gaseous sample forms continuously. Starting at a determined temperature, the ignition source is introduced into the container in periodical time and/or temperature intervals in order to ignite the developed liquid-gas-air-sample mixture. If a flame is detected at a particular sample temperature, the burning time of which is less than 5 seconds, then the flashpoint is determined. If the burning time is longer than 5 seconds, then the combustion point of the sample is determined.

Different standard methods are suitable for a flashpoint determination, which methods are characterized substantially by the methods according to i) Pensky-Martens, ii) Abel, iii) Abel-Pensky, iv) Tagliabue, and v) Cleveland.

Conventionally, for igniting the sample to be investigated, an ignition source is used, which comprises for example a, in particular open, glow wire or a coiled glow filament. Alternatively, the ignition may be effected conventionally by a spark gap between two electrodes or by a gas flame.

U.S. Pat. No. 5,176,449 A discloses a device and a method for determining a flashpoint of a liquid or of a solid material, wherein the pressure that is obtained in the measurement chamber after an ignition is measured. At a given temperature, a vapor-air-mixture is ignited, and the pressure increase due to the temperature increase is used as a measure for the size of the flame for determining the flashpoint. The ignition is effected by two electrodes, which generate a spark.

GB 1 279 396 A discloses a system for testing the flashpoint of a flammable product. For igniting, an ignition flame is introduced into a crucible, in which the sample to be investigate is arranged.

U.S. Pat. No. 3,913,600 A discloses a method for monitoring and controlling the composition of a flammable gas mixture, wherein ignitions are performed by an ignition plug. To this end, a high voltage is applied to electrodes of the ignition plug.

U.S. Pat. No. 2,170,056 A1 discloses an apparatus for detecting the concentration of combustible gases. For the ignition, an ignition plug is used, which is operated periodically by a synchronous motor.

GB 185 814 A discloses a system for determining the flashpoint of oils. The vapor is ignited electrically by a spark or by coils. Therein, plural heating coils are arranged underneath a lid of a receptacle. As soon as a coil is heated, the space above the oil is opened towards the atmosphere. The coils are not described in detail in this document.

GB 1 257 323 A discloses a flashpoint detector. An ignition plug is used for igniting. The temperature of the sample is increased until a spark that is generated by an ignition plug ignites the vapor. Therein, the ignition plug is activated by pulses by a generator.

DE 552 706 C discloses a device for testing flammable materials, in particular lubricating oils, wherein a heatable crucible is used for receiving the material to be investigated, and wherein electrically heatable spirals (or coils) that are arranged above the crucible are provided for the ignition of the oil vapors during the flash and combustion point determination as well as for an indication of flame formation.

DE 1 598 631 A1 discloses a measurement device for determining the flashpoint of combustible liquids by a flow-through crucible, which is provided with corresponding heating elements. Therein, the combustible, heated vapor-air-mixture flows along a coiled ignition filament, which ignites the mixture.

The ignition devices known from the state of the art, which are usable for a standardized flashpoint determination or combustion point determination, are sensitive with respect to damage and/or are operable only with corresponding complex drivers (e.g. for the generation of high voltage).

SUMMARY

Thus, there is a need to establish an ignition device, which is usable for a flashpoint determination test, which ensures a reliable ignition of the sample to be investigated, is robust against damages and can be operated by simple driver components. In particular, there is a need to provide a device, which can be operated stably and reliably without high voltage, and is robust against damages.

The object is solved by the subject-matter of the independent patent claims. The dependent claims specify particular embodiments of the present invention.

According to an embodiment of the present invention, there is provided a device for igniting a sample arranged in a container for a flashpoint determination test and/or a combustion point determination test, the device having: an electric igniter, which has an ignition tip having a partially or completely encapsulated electric wire; and a traversing device (or moving device), which is configured for traversing (or moving) the ignition tip of the electric igniter to a (e.g. specifically for electric ignition) defined position within the container.

Overview of Embodiments

The device for igniting may be suitable for a standardized flashpoint determination test and/or combustion point determination test, which may correspond e.g. to one or more of the following standards (or norms) (respectively at least for the versions that are valid at the application date): ASTM D93, DIN EN ISO 2719, GB/T261, IP 34, JIS K 2265, ISO 13736, ISO 1516, ISO 1523, DIN 51755-1 (Abel-Pensky with corresponding accessories); ASTM D56, ASTM D3934, ASTM D3941; ASTM D92, DIN EN ISO 2592, IP 36, IP 403. Embodiments may correspond to further standards that are not mentioned herein. Embodiments of the present invention may support methods according to i) Pensky-Martens and/or ii) Abel and/or iii) Abel-Pensky and/or iv) Tagliabue and/or v) Cleveland.

The flashpoint determination test may be used e.g. for kerosene, oil, generally for hydrocarbon-containing substances, e.g. for quality testing. The flashpoint determination test may be performed e.g. with one of the experimental set-ups, which have been developed by Sir Frederik Abel, Adolf Marten, Berthold Pensky, or Charles J. Tagliabue.

During the flashpoint determination test, the sample to be investigated may be received in a closed or in an open container. Both classes of flashpoint tests may be supported by embodiments of the present invention. Embodiments of the present invention may support test methods, wherein an equilibrium state, a non-equilibrium state or a quick equilibrium state may be present within the container. Non-equilibrium state methods may correspond e.g. to one or more of the standards DIN EN ISO 13736, ASTM D56, DIN EN ISO 2719, ASTM D93, DIN EN ISO 2592, ASTM D92. Equilibrium state methods may correspond to e.g. to one or more of the standards DIN EN ISO 1516, DIN EN ISO 1523, DIN EN 924, ASTM D3941, DIN 53213. Quick equilibrium state methods may correspond e.g. to the standard DIN EN ISO 3679.

During the performing of a flashpoint determination test, the sample to be investigated may be stirred or may not need to be stirred.

During the performing of the flashpoint determination test, the temperature of the sample within the container may be measured at one or more positions (for instance in the gaseous phase and/or the liquid phase). Furthermore, the atmospheric pressure and/or the pressure within the container may be measured, and the measurement results may be corrected accordingly. The flashpoint determination system according to embodiments of the present invention may be configured e.g. to determine flashpoints in a range of from −40° C. to +410° C.

Parts of the electric igniter and/or of the ignition tip may have a substantially cylindrical shape and/or a cylindrical symmetry. The ignition tip can, upon operating the electric igniter, reach e.g. a temperature between 900° C. and 1500° C., in particular between 1300° C. and 1400° C. The highest temperature of the electric igniter may be reached at the ignition tip (in particular at a front end of the ignition tip or close to the front end of the ignition tip). The ignition tip may have a pyramid-shape or a (hemi-) spherical shape. Further geometrical shapes may be possible.

The encapsulation and/or sheathing of the electrical wire may act as a protection of the electric wire within the ignition tip. The electric wire (in particular a coiled ignition filament described in detail below as a part of the electric wire) may be surrounded with metallic or ceramic material for the encapsulation, in particular a liquid-tight and/or a gas-tight encapsulation. Alternatively, the encapsulation and/or sheathing may also be formed of other heat-resistant materials, for example of glass or of a heat-resisting polymer. The encapsulation or sheathing of the electric wire may also result in a substantially homogeneous temperature in the region of the ignition tip. Herein, the ignition tip may be formed by the sheathing and the coiled ignition filament (and possible filling material) arranged therein. The ignition tip may form an end of the electric igniter. Another end of the electric igniter may be attached (e.g. by screw-fastening) to an electric igniter mounting (or fixture). The ignition tip may have e.g. a diameter (in cross-section), which is e.g. two times to five times smaller than a diameter of the other end of the electric igniter. The size of the ignition tip (in particular the cross-sectional diameter thereof) may be selected according to specifications of a, preferably standardized, flashpoint determination test in order to ensure an ignition in a defined spatial region (in particular within the container). The ignition tip may be e.g. bar-shaped or be manufactured from a homogeneous material. In particular, the ignition tip may be manufactured from ceramics, and may be resistant against temperatures up to 1500° C. or even 2000° C.

The position defined for the electric ignition within the container may be defined e.g. by a defined distance underneath a lid of the container, or by a defined distance from the liquid surface of the sample to be investigated to the ignition tip, or by a defined distance from a bottom of the container. Herein, the defined position may be defined in particular by the vertical component thereof, wherein a lateral component is free, such that no necessarily defined lateral position has to be reached. If the defined position within the container of the heat tip is reachable (or approachable) by the traversing device, a standardized flashpoint determination test may be performed.

The container may concern in particular a substantially cylindrical container having a lid. Advantageously, the electric igniter may be operated by applying a voltage (e.g., a direct current or DC voltage) to ends of the electric wire, so that the temperature of the ignition tip rises strongly, so that ignition temperatures may be reached. Thus, a simple operation of the electric igniter may be ensured. By the encapsulation and/or sheathing of the electric wire, the latter may be protected against damage, thus robust. A possible abutting during the traversing by the traversing device thus may not result in a damage of the electric wire.

According to an embodiment of the present invention, the electric wire may be encapsulated and/or surrounded, in particular liquid-tight and/or gas-tight, such that the sample in the liquid and/or in the gaseous state does not directly (or also not indirectly) contact the wire. Thus, on the one hand, a contamination of the sample due to a conventionally occurring contact with the wire may be avoided, and, on the other hand, a contamination or impairment of the wire may be avoided. Thus, the integrity of the wire during the operation may be ensured, so that for example a heating capacity may not be impaired by the sample or components of the sample, and also the structural integrity of the wire may be ensured. Thus, a protection against damage may be ensured, in order to be able to perform a flashpoint determination test reliably.

According to an embodiment of the present invention, the traversing device may be configured to traverse the ignition tip of the electric igniter along a rectilinear traverse distance (in particular without tilt/rotation) (e.g. downwards and upwards), which traverse distance may extend in particular substantially vertically or encloses an acute angle to the vertical.

The rectilinear traversing distance may be free from arcs or curves, such that the ignition tip of the electric igniter may be moved and/or traversed to the defined position (e.g. from a parking position above the container, in particular above a lid of the container) without a tilt and without components of rotational movement. Thus, a simple movement may be enabled, which may simplify the traversing device. If the traverse distance extends substantially vertically or extends enclosing an acute angle to the vertical, the ignition tip may be moved quickly and reliably to the defined position within the container through a relatively small lid opening of a lid of the container. If the rectilinear traverse distance encloses an angle to the vertical, then for example and advantageously a stirrer and/or a temperature and/or measurement head (or sensing element) may be inserted from the above through the lid into the container, without the electric igniter or parts of the electric igniter being in the way. The ignition tip may thus be moved by the traversing device obliquely from above (e.g. through a lid opening) to the defined position within the container.

According to an embodiment of the present invention, the traversing device may further have an electric motor, preferably having a crank drive, which may be coupled to the electric igniter. Upon activation, the electric motor may perform a rotational movement, which may be transformed in a translational movement by the crank drive. A shaft, which may be arranged eccentrically to an axis of the electric motor, may e.g. engage in an oval opening, which may be coupled to an electric igniter mounting (or fixture). Upon operation of the electric motor, the eccentrically arranged shaft may change its position within the oval opening and can touch against inner delimitation areas of the oval opening. By the pressure, which may occur thereby on different delimitation areas of the oval opening, the electric igniter mounting that may be connected thereto may be moved along the rectilinear traverse distance. The movement speed may not necessarily need to be constant e.g. for a constant rotation speed of the motor. In particular, at the beginning and towards the end of the movement of the ignition tip, the speed of the rectilinear movement may be lower than in a middle region between end points of the movement. Thus, also the damaging of components of the device may be avoided. The crank drive may enable a simple conversion of a rotational movement in a translational movement, so that a simple drive may be enabled.

Other mechanical components may be provided instead or in addition to the crank drive in order to convert the rotational movement generated by the motor in a translational movement. To this end, e.g. a screw thread may be provided at the motor shaft, which may engage in a gear rod (or toothed bar) that may be coupled to the electric igniter. Also, pneumatic or hydraulic drives may be possible.

According to an embodiment of the present invention, the traversing device may have an electric igniter mounting (or fixture), by which the electric igniter may be mountable, in particular may be screw-fastenable, and the wire may be electrically connectable (e.g. with a driver) to the wire, and may be encapsulated and/or sheathed by a housing by the wire. Thus, flexible cables, which may conventionally lie open, may be avoided in order to thus possibly simplify a handling or avoid in particular a cable mess, or cable knottings ("cable spaghetti"), or a damage of cables. The electric igniter may be fastened with a screw or screws e.g. to an electric igniter mounting, wherein at the same time connecting contacts (at least two connecting contacts) of the wire and/or two wire ends may be connected electrically to electrical contacts within the electric igniter mounting. Within the electric igniter mounting, flexible cables may be present, which may enable a traversing of the ignition tip due to the flexibility. These flexible cables that may be present within the electric igniter mounting may however be surrounded by a housing (of the electric igniter mounting), and thus may not be accessible and visible from the outside. Thus, a simple handling of the device may be enabled, and loose wires may not collide and/or touch other components or a user.

According to an embodiment of the present invention, the traversing device may have a, in particular sleeve-shaped (or ferrule-shaped), guide or guidance member having a guide opening defined by parallel internal walls, through which at least a part of the electric igniter mounting and/or at least a part of the electric igniter may be passed through, wherein in particular an outer surface of a part of the electric igniter mounting and/or a part of the electric igniter may slide along on the parallel internal walls of the guide during the traversing of the electric igniter. The guide may ensure that the movement of the ignition tip may be effected along the rectilinear traverse distance. In particular, the ignition tip may be lowered along the traverse distance described by the guide into the container and be moved upwardly from the latter. Thus, a collision with e.g. parts of the container and/or parts of walls of the container and/or parts of a lid may be avoided. The internal walls and/or the guide opening may have e.g. substantially cylindrical symmetry or also a cylinder shape. Thus, e.g. a cylinder-shaped electric igniter mounting may be guided reliably in a simple manner. Also, other geometric shapes of the internal walls and/or of the guide opening may be conceivable.

According to an embodiment of the present invention, the device may further have a gas supply device having a gas supply line having a gas outlet opening, wherein the gas supply line may be attachable section-wise offset parallel to a longitudinal direction (e.g. of a shaft/sleeve) of the electric igniter, preferably reversibly, (in particular at the electric igniter mounting and/or at a part of the electric igniter), wherein the attached gas supply line may be synchronously traversed together during a traversing of the ignition tip of the electric igniter by the traversing device, wherein the traversing device may be in particular configured to traverse the gas outlet opening to a (e.g. specifically for the gas ignition) defined position within the container.

The gas supply device may be provided for a gas ignition of the sample to be investigated. The gas supply device may be an optional feature, i.e. not contained in all embodiments according to the invention. The gas supply device may be attachable at, and releasable from, e.g. the electric igniter mounting. Thus, also flashpoint determination tests may be supported, which may require a gas ignition. The gas ignition device may not have a traversing device that is provided (additionally) specifically or exclusively for the gas supply device, but may be traversed by the (same) traversing device, by which also the electric igniter may be traversed (in particular along the rectilinear traverse distance). Thus, the device may be extended also for a gas ignition, without requiring additional traversing components. The traversing distance of the gas outlet opening may be parallel to (or in particular substantially colinear with) the traverse distance of the electric igniter and/or the ignition tip of the electric igniter. The position of the gas outlet opening that may be defined for the gas ignition may be the same or different from the position of the ignition tip that may be defined for the electric ignition. Thus, different standards or norms of flashpoint determination tests may be supported.

According to an embodiment of the present invention, the gas outlet opening of the gas supply line may be arranged underneath the ignition tip of the electric igniter, in particular underneath along the longitudinal direction of the electric igniter, such that a gas that may exit from the gas outlet opening is flammable by operating the electric igniter.

According to an embodiment of the present invention, the gas supply line may have a bend (or flexure) formed such that the gas outlet opening may be arranged underneath the ignition tip of the electric igniter, in particular underneath along the longitudinal direction of the electric igniter, and such that a gas that may exit from the gas outlet opening is flammable by operating the electric igniter. Thus, the electric igniter may be used for igniting the gas that may exit from the gas outlet opening, which gas may be used in turn, during a flashpoint determination test, for igniting the sample arranged within the container. Herein, the electric igniter may not need to be removed (from the traversing device and/or the electric igniter mounting), but may remain unchanged in its position. In particular, the gas supply device may be configured in order to be able to be used as an ignition in a flashpoint determination test, without changing the electric igniter in its position or orientation. Thus, a handling of the device may be simplified, in particular a (time) expensive and/or complicated rebuilding of the device for enabling a gas ignition, may be avoided. Thereby, e.g. a flashpoint determination test or plural flashpoint determination tests, which may require on the one hand an electric ignition, and on the other hand a gas ignition, may be performed in a shorter time. The gas supply line may have straight sections above and below the bend.

According to an embodiment of the present invention, for a, preferably reversible, mounting of the gas supply line, a gas supply line mounting may be provided, which may have a, in particular cylindrical, passage opening, through which the gas supply line may be guided and fixable, in particular by a screw, and which may further have fixation means, in particular a clamp and/or a clip, which may be configured to fix the gas supply device at least partially to a part of the electric igniter and/or a part of the electric igniter mounting, in particular elastically and/or by a screw and/or magnetically. Thus, a reversible fixation of the gas supply line may be achieved. The gas supply line mounting may be attached e.g. in an e.g. cylindrical indentation or a ring-shaped indentation at the electric igniter mounting, in particular by a form-fit and/or a frictional connection (or closed linkage). Thus, the gas supply line may be attached or removed in a simple manner, if required. A vertically defined positioning of the gas supply line (and/or in particular of the gas outlet opening at the end of the gas supply line) may be defined or given in particular due to the positioning of the ring-shaped indentation at the electric igniter mounting. An elastic mounting may simplify a handling, while a mounting with an (additional) screw may ensure a reliable and firm mounting.

According to an embodiment of the present invention, the passage opening, within which the gas supply line may be fixed, may be provided at a bent end of a retaining arm that may extend substantially vertical and that may be mounted, in particular vertically adjustable, at the fixation means.

The gas supply line may extend rectilinearly through the passage opening. Due to the bending of the retaining arm, the gas outlet opening of the gas supply line may be arranged underneath the ignition tip of the electric igniter, in particular underneath along the longitudinal direction of the electric igniter, so that a gas that may exit from the gas outlet opening may be flammable by operating the electric igniter.

According to an embodiment of the present invention, a pin may furthermore be provided, which may be pluggable through a passage opening of the clamp (or clip) of the gas supply line mounting and a hole of the electric igniter and/or of the electric igniter mounting in order to achieve a defined vertical positioning of the gas outlet opening relative to the ignition tip. Instead of a pin, a simple protrusion on an inner surface of the clamp may be provided (e.g. integrated), which protrusion may engage, in particular may snap-fit, into a hole (or a depression) of an outer surface of the electric igniter mounting. Thus, a precise positioning of the gas outlet opening within the container may be achieved.

According to an embodiment of the present invention, furthermore, a magnet may be provided, to which a magnetic attractive force may be applied by a magnet or a magnetizable material fixed to a part of the electric igniter and/or the electric igniter mounting in order to achieve a defined vertical positioning of the gas outlet opening relative to the ignition tip.

According to an embodiment of the present invention, the transfer device may be configured to traverse the electric igniter (and/or the electric igniter mounting) downwardly selectively by a first transfer distance or a second transfer distance as a function of a desired type of ignition (e.g. electric ignition or gas ignition), in order to move either the ignition tip of the electric igniter (in the case of selected electric ignition) or in the case of a mounted gas supply line (and selected gas ignition) the gas outlet opening to the respectively defined position (e.g. within the container). For transferring the gas outlet opening to the defined position (for gas ignition), the transfer distance may be shorter than the transfer distance which is conceived by the ignition tip in the case of electric ignition. The gas outlet opening may thus be positioned underneath the ignition tip in order to advantageously be able to ignite a gas that may exit from the gas outlet opening, if needed, by the operated ignition tip of the electric igniter.

According to an embodiment of the present invention, the electric igniter may be configured as a glow plug (e.g. for the automotive area, e.g. for pre-glowing a diesel motor), in particular as a metal or ceramic glow plug. Thus, the electric igniter may be available conventionally, which thus may lower the costs of the device.

According to an embodiment of the present invention, the ignition tip may have a sleeve (e.g. a cylindrical sleeve), which may be manufactured of metal and/or ceramics, which may be closed (which e.g. forms the sheathing) at the front end, in the hollow space in a front region of which a coiled glow filament may be arranged. The coiled glow filament may heat the whole ignition tip to a temperature required for the ignition of the sample. In order to ensure a quick heating, the voltage applied to the electric igniter may be regulated.

The hollow space of the sleeve may be evacuated, or be filled with a suitable medium, for example gas or sand.

According to an embodiment of the present invention, the electric igniter may further have, in the hollow space in a rear (or middle) region, a coiled regulation filament, in particular having a resistance that may rise with the temperature, which filament may be electrically connected to the coiled glow filament. Thereby, a quick heating may be achieved, if a constant voltage is applied, wherein the heating power may decrease with rising temperature for a constant voltage, in order to thus reach a target value of a temperature of the ignition tip slowly. Such coiled glow filaments and coiled regulation filaments may be present in conventionally available glow plugs.

According to an embodiment of the present invention, the device may further have a driver module, which may be configured and connected to apply a direct voltage (or d.c. voltage) between ends of the wire of the electric igniter, in order to guide an electric direct current (or d.c. current), in particular between 5 Ampere and 15 Ampere, through the coiled glow filament. Thus, no high voltage supply may need to be provided in order to achieve an ignition by the electric igniter. Furthermore, no pulsed operation may be required, the direct voltage may remain uninterruptedly and/or for a desired electric ignition be applied continuously (in any case during a desired ignition time period). Thus, the device may be further simplified with respect to conventionally used devices.

According to an embodiment of the present invention, a flashpoint determination system (which may be configured e.g. also for the determination of the combustion point) may be provided, which may have: a container for receiving a (liquid and/or gaseous) sample to be investigated; in particular an (optional) lid for closing the container (in particular at an upper side), wherein the lid may have a closable lid opening; a heating device for heating the sample with a heating rate and/or to a defined temperature; and a device for igniting the sample arranged in the container according to any one of the embodiments described precedingly.

If a lid is present, the device for igniting may be arranged such that upon a transferring of the ignition tip of the electric igniter to the defined position within the container the ignition tip may be guided through the lid opening.

The container may be, e.g. substantially, cylindrical. The sample may, in the liquid state, fill e.g. about ⅓ to ⅔ of the inner space of the container. Above the liquid level of the sample within the container, the sample may be present in the gaseous state, in particular mixed with air.

Not all embodiments of the flashpoint determination system may have a lid, because some flashpoint determination tests may be performed with an open container. The lid of the container may thus be optional. The closable lid opening may enable the insertion of an igniter, in particular the electric igniter, and also of the gas outlet opening of the (optional) gas supply line, so that the flashpoint determination system can be configured for igniting by electric ignition and for igniting by gas ignition. During a flashpoint determination test, the sample within the container may be heated up (or cooled down) to a particular temperature by the heating device (e.g. an electric heating device or a combustion heating device) (or more generally a temperature-control device for heating and for cooling), whereupon the (initially closed) lid opening may be opened (e.g. by a pusher) in order to move either the ignition tip of the electric igniter or the gas outlet opening of the gas supply line to the respectively defined position within the container. Thereupon, the electric igniter may be operated, in order to either act itself as the igniter, or in order to ignite a gas that may exit from the gas outlet opening, by which gas the sample may be ignited. Whether an ignition of the sample is effected, may be determined by one or more detectors, which may be guided into the container through other entry openings within the lid, or which reach into the open container without traversing through the lid. If the presence of the flashpoint could not be detected, then the sample may also be brought to another (e.g. higher) temperature, whereupon a further ignition test may be effected.

It should be understood that features, which have been discussed or are provided individually or in any combination, in connection with a device for igniting a sample arranged in a container for a flashpoint determination test, are also applicable individually or in any combination for a method of an igniting of a sample arranged in a container during a flashpoint determination test, and vice versa, according to embodiments of the present invention.

According to an embodiment of the present invention, there is provided a method of an igniting of a sample arranged in a container during a flashpoint determination test and/or a combustion point determination test, the method having: traversing an ignition tip of an electric igniter, or a gas outlet opening of a gas supply line coupled to the electric igniter, to a defined position within the container, wherein the electric igniter has an ignition tip having an encapsulated electric wire.

Embodiments of the present invention support all flashpoint determination techniques that are known at the application date, also those, which require an open container and which require e.g. also a horizontal movement of the igniter. To this end, the traversing device may also be configured to move the ignition tip in a horizontal direction, in particular to laterally different positions within the container.

DETAILED DESCRIPTION OF ILLUSTRATED EMBODIMENTS

Figure 1A:
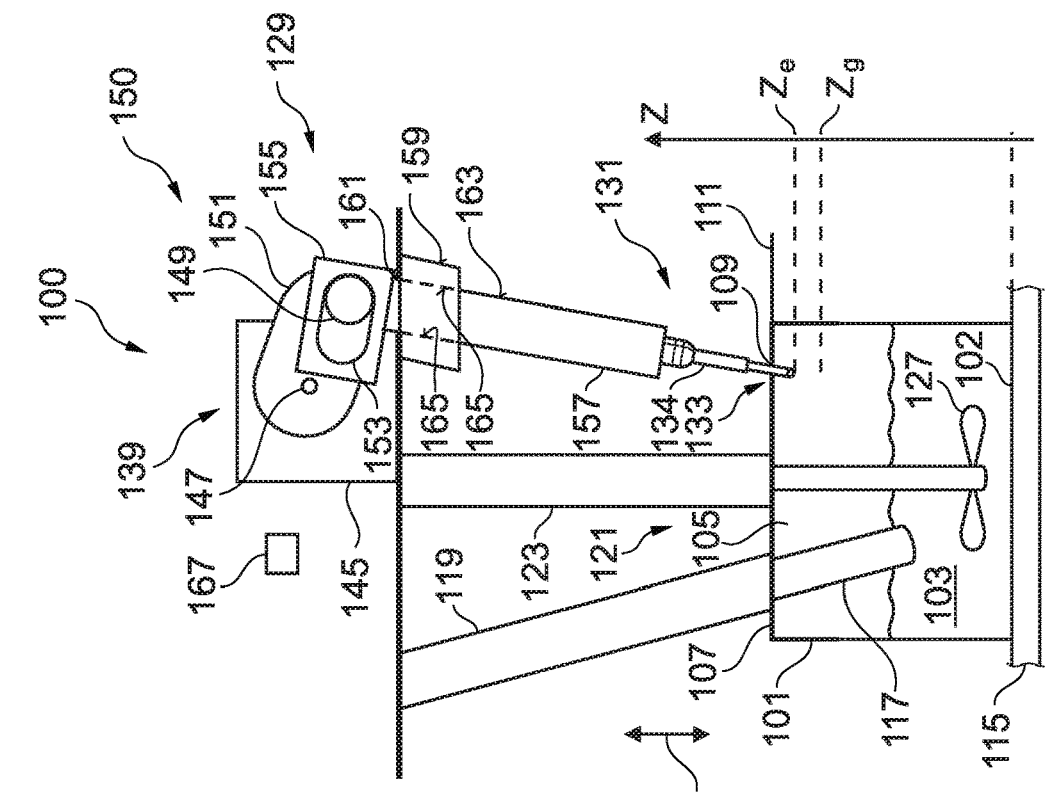
FIG. 1A and FIG. 1B illustrate in schematic side views a flashpoint determination system according to an embodiment of the present invention, which has a device for igniting according to an embodiment of the present invention, in two different traversing states, which are attained e.g. in a method of an igniting of a sample arranged in a container during a flashpoint determination test according to an embodiment of the present invention.

Elements, which are same or similar in function and/or structure are referred to in different figures by reference numerals, which differ only in the first digit. A description of an element, which is not explained in detail in a particular embodiment, can be taken from a corresponding description of this element in another embodiment.

Figure 1B:
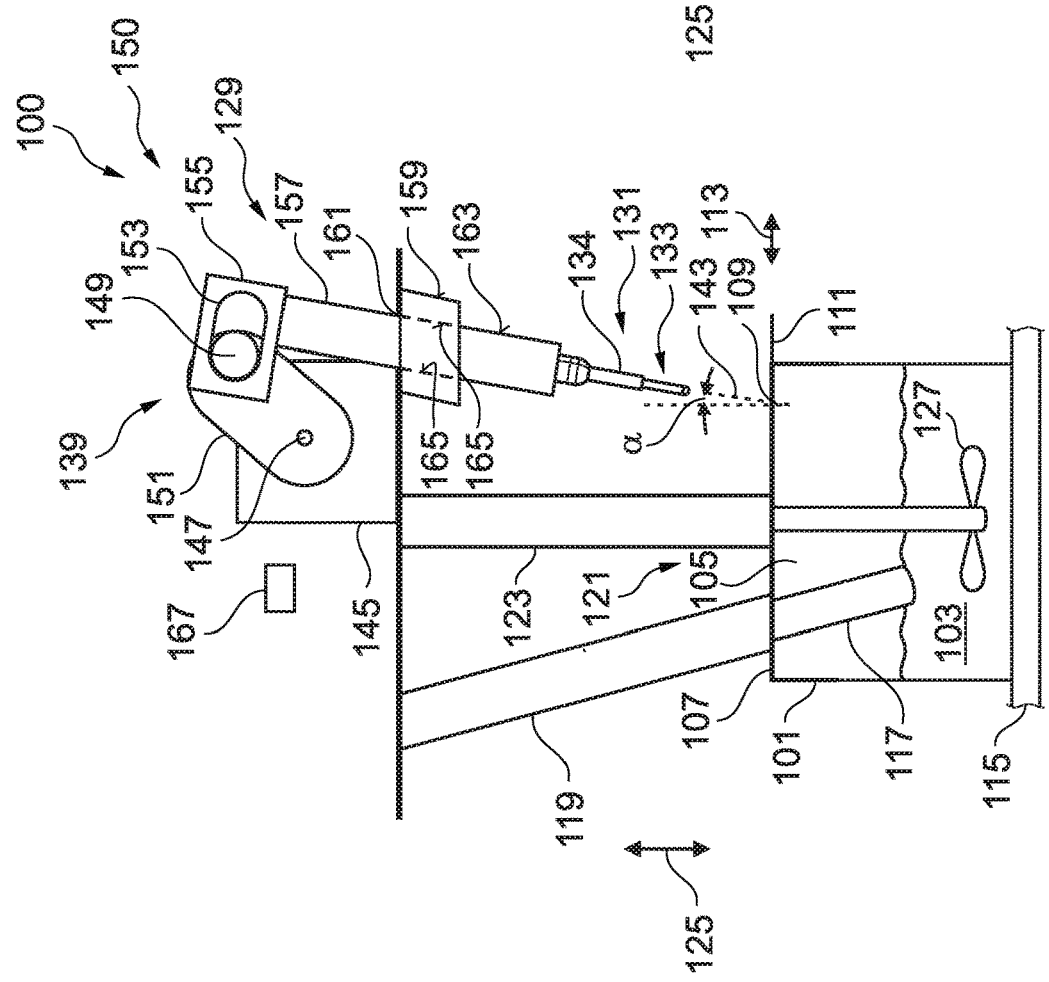

The flashpoint determination system 100 according to an embodiment of the present invention, which is illustrated in the FIGS. 1A and 1B in two different traversing states, may have a container 101 for receiving a sample to be investigated, which sample may have a liquid portion 103 and a gaseous portion (and/or sample-gas-air-mixture) 105. The flashpoint determination system 100 may further have a lid 107 for closing the container 101 at an upper side, wherein the lid may have a closable lid opening 109. In the illustrated embodiment, the lid opening 109 may be closable and openable by a pusher 111, for which purpose the pusher 111 may be shifted e.g. along the directions indicated by the arrow 113.

FIG. 1A illustrates the state, in which the lid is closed by the pusher 111, whereas FIG. 1B illustrates the state, in which the pusher 111 is pushed back, such that the lid opening 109 may be open and the inside of the container 101 may be in contact with the surroundings.

The flashpoint determination system 100 may further have a heating device 115, which may be configured for heating the sample 103, 105 within the container to a particular temperature. For measuring the temperature, the flashpoint determination system 100 may have optional measurement sensing elements 117, which may be configured e.g. for measuring the temperature within the liquid phase 103. The measurement sensing elements 117 may be inserted into the interior of the container 101 through a further opening in the lid 107, for which purpose a rod 119 may be conceived.

Optionally, the flashpoint determination system 100 also may have a stirrer 121, which may have a stirring rod 123, which may be guided through the lid 107 and which may be supported rotatably around a substantially vertical direction 125. Stirring paddles 127 may be fixed at the lower end of the stirring rod 123 within the container 101. The sample 103, 105 may be stirred, e.g. during a flashpoint determination test, by the stirrer 121. The stirrer 121 may be optional, thus not necessarily present in all embodiments.

Figure 4:
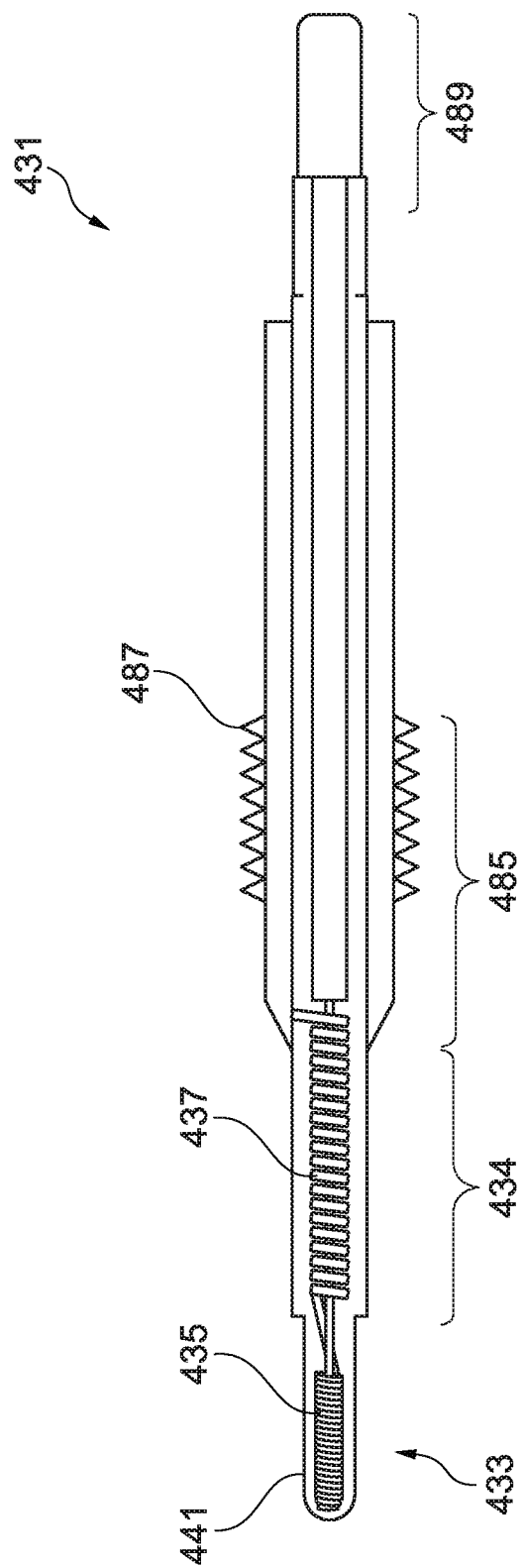
FIG. 4 illustrates in a schematic longitudinal cross-sectional view an electric igniter according to an embodiment of the present invention, which, according to an embodiment of the present invention, is comprised in a device for igniting a sample arranged in a container for a flashpoint determination test.

The flashpoint determination system 100 further may have a device 129 for igniting the sample 103, 105 arranged in the container 101, according to an embodiment of the present invention. The device 129 for stirring the sample 103, 105 arranged in the container 101 may have an electric igniter 131, which may have an ignition tip 133 having an encapsulated electric wire (not illustrated in the FIGS. 1A and 1B). The electric wire may have e.g. a coiled glow filament 435 and a coiled regulation filament 437, as is illustrated in FIG. 4 in a longitudinal cross-sectional view as an example of an electric igniter 431 according to an embodiment of the present invention. The electric igniter 131 in FIG. 1 may be composed like the electric igniter 431 illustrated in FIG. 4.

The wire 435, 437 of the electric igniter 131, 431 illustrated in FIG. 4 may be encapsulated and/or sheathed liquid-tightly and gas-tightly by a sheathing 441, which may comprise e.g. a sintered ceramic. The sheathing may have a cylindrical shape in the region of the ignition tip 433, within which the coiled glow filament 435 may be arranged. The sheathing may continue also in the igniter shaft 134, 434, in which the coiled regulation filament 437 may be located.

The device 129 for igniting may further have a transferring device (or moving device) 139, which may be configured for traversing (or moving) the ignition tip 133 of the electric igniter 131 to a defined (for an electric ignition) position ze, e.g. defined by a vertical distance from a bottom 102 of the container 101 or by a vertical distance from the lid 107. A gas outlet opening of a gas supply line that is described further below may be traversed e.g. to a position zg, which may be the same as or different from ze.

The traversing device 139 may be configured to traverse the ignition tip 133 of the electric igniter 131 upwardly and downwardly along a rectilinear traverse distance 143. In the illustrated embodiment, the traverse distance (or moving distance) 143 may enclose an acute angle α (e.g. between 5° and 40°) to the vertical direction 125.

The traversing device may have an electric motor 145 having a motor shaft 147, at which an eccentrically arranged shaft 149 may be mounted via a connection piece 151. The eccentrically arranged shaft 149 may engage in an oval opening 153 of a further connection piece 155, which may be connected to an electric igniter mounting 157. The connection piece 151, the eccentrical shaft 149, the oval opening 153, and the further connection piece 155 may form a crank drive 150, which may be configured to transform a rotational movement of the electric motor 145 in a translational movement, i.e. a rectilinear movement. For e.g. a rotation of the motor shaft 147 around less than 90°, the ignition tip 133 may thus be traversed along the rectilinear traverse distance 143 from the position (e.g. parking position) illustrated in FIG. 1A to a defined position (vertical position ze), which may be conceived in a flashpoint determination test, as is illustrated in FIG. 1B. The ignition tip 133 in FIG. 1B may be located underneath the lid 107 and within the container 101.

The electric igniter mounting 157 may be conceived in order to support the electric igniter 131, wherein the electric igniter 131 may be connectable in particular by a screw-fastening to the electric igniter mounting 157 and is illustrated connected in the FIGS. 1A and 1B.

The traversing device 139 may further have a guide or guidance 159 having an opening or guidance opening 161, which may be defined by internal walls 165, through which at least a part of the electric igniter mounting 157 may be passed through. Therein, parts of an outer surface 163 of the electric igniter mounting 157 may slide along at parallel internal walls 165 of the guide 159, which walls may define the guidance opening 161.

The flashpoint determination system 100 may further have a driver module 167, which may be configured and connected to the electric igniter 131 (via non-illustrated electric cables), in order to apply a direct voltage between two ends of the wire (e.g. 435, 437) of the electric igniter 131, in order to guide an electric direct current in particular through the coiled glow filament (e.g. 435 in FIG. 4).

Figure 2:
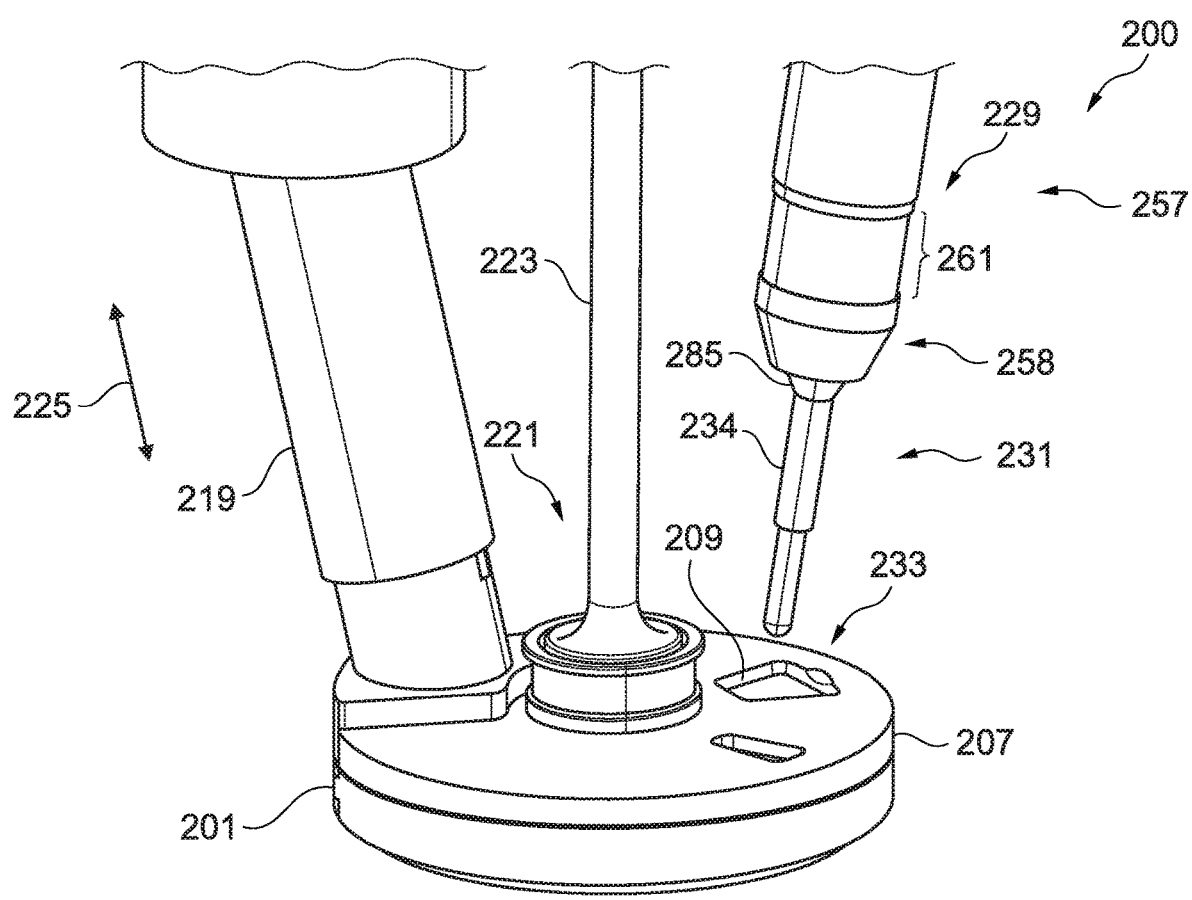
FIG. 2 illustrates in a schematic perspective representation a part of a flashpoint determination system according to an embodiment of the present invention.

FIG. 2 illustrates, in a schematic perspective representation, a part of a flashpoint determination system 200 according to a further embodiment of the present invention. FIG. 2 illustrates the state, in which a covered (or concealed) ignition tip 233 of the electric igniter 231 is positioned at a defined position within the container 201.

The electric igniter 231 of the flashpoint determination system 200 may have an ignition tip 233, which may be guided through the lid opening 209 of the lid 207, and which may be partially concealed by the lid 207, and which may be delimited to the outside by a ceramic sheathing, and in the interior of which a coiled glow filament may be arranged, such as it is indicated e.g. in FIG. 4 by the reference numeral 435. In the upward direction, there may be attached an igniter shaft 234, which may have a somewhat greater diameter, in the interior of which shaft the coiled regulation filament (e.g. 437) may be arranged. Further upwardly, there may connect a fixation section 285, which may have e.g. an outer thread for the fixation to the electric igniter mounting 257. The electric igniter mounting may have substantially a cylindrical symmetry and may have substantially a cylindrical shape.

The electric igniter mounting 257 may have a coupling section 258, which may have e.g. an inner thread, into which the glow plug and/or more generally the electric igniter 231 may be screwed in. Furthermore, the electric igniter mounting 257 may have a fixation section 261 of a gas line mounting, which section may be formed by a ring-shaped peripheral indentation in the outer surface of the electric igniter mounting 257, and which may be clampable by a clamp of a gas line mounting for a gas supply device, as can be seen e.g. in FIG. 3.

Figure 3:
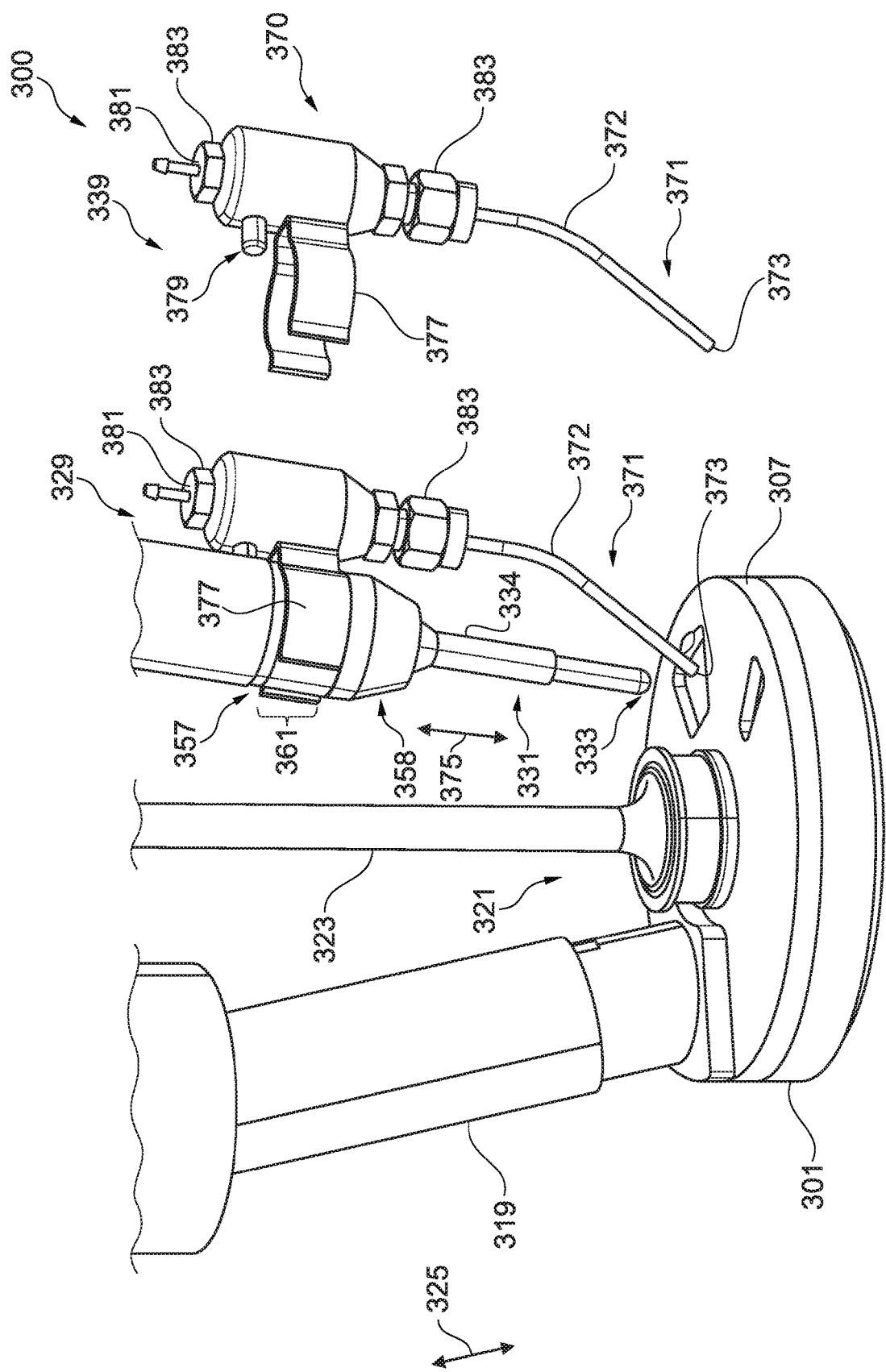
FIG. 3 illustrates in a schematic perspective representation a part of a flashpoint determination system having a gas supply device according to an embodiment of the present invention.

FIG. 3 illustrates, in a schematic perspective representation, a flashpoint determination system 300 according to a further embodiment of the present invention, wherein similarities to the flashpoint determination system illustrated in FIG. 2 are present. In FIG. 3, there is illustrated a state of an ignition tip that is not arranged within the container 301, e.g. while the sample is brought to a particular temperature with a closed lid 307.

In contrast to the embodiment illustrated in the FIGS. 1A, 1B and 2, the device 329 for igniting the sample arranged in the container 301 may further have a gas supply device 370 having a gas supply line 371 having a gas outlet opening 373 (at one end of the gas supply line 371), wherein the gas supply line 371 may be reversibly mountable section-wise parallel offset to a longitudinal direction 375 (parallel to the traverse path 143, see FIG. 1) of the electric igniter 331 to the electric igniter mounting 357, and in particular in the fixation section 361 of the gas line mounting. The gas supply line 371 may have straight sections adjacent to a bend 372, one of which may lead to the gas outlet opening 373. By the bend 372, the gas outlet opening 373 may be located underneath the ignition tip 333.

In the right-hand part of FIG. 3, the gas supply device 370 is taken away, i.e. separated from the device 129 and/or 329 for igniting, and in particular separated from the electric igniter mounting 357, while on the left-hand side of FIG. 3, the gas supply device 370 is mounted to the electric igniter mounting 357 by a clamp 377. The clamp 377 may be part of a gas line mounting 379, which may have a cylindrical passage opening 381, through which the gas supply line 371 may be guided and may be fixable, in particular by a clamping screw 383. The gas line mounting 379 may further have the clamp 377, which may be configured to clamp around at least partially a part 361 of the electric igniter mounting 357 elastically or by a screw. Furthermore, a pin may be provided, which may be guided through a non-illustrated opening within the clamp and into a hole in the electric igniter mounting 357, in order to enable a defined vertical positioning of the gas supply device 370, in particular of the gas outlet opening 373 relative to the ignition tip 333.

The electric igniter 431 that is illustrated in FIG. 4 in a schematic longitudinal cross-sectional view may be configured as a glow plug, which may have in its front end as an ignition tip 433 a closed sheathing (or ferrule) 441, in the hollow space of which there is arranged a coiled glow filament 435. The electric igniter 431 may have, in a fixation section 485, an outer thread 487, by the help of which the electric igniter 431 may be supported by the electric igniter mounting (e.g. 157, 257, 357 in the FIGS. 1 to 3) and/or may be screw-fastened. A connection section 489 may enable an electric connection of the wire, in particular the coiled glow filament 435 and the coiled regulation filament 437, with e.g. an exterior circuit, e.g. the driver module 167, which is illustrated in the FIGS. 1A and 1B. The interior space and thus also the coiled glow filament 435 and the coiled regulation filament 437 may be sealed gas-tightly and liquid-tightly against the outer space by the sheathing 441. For this purpose, one or more seals may be provided within the electric igniter.

The electric igniter may be formed as a glow plug known from the automotive sector, such as it is used e.g. in diesel engines for pre-glowing. The encapsulation (e.g. the sheathing 441) may protect sensitive parts against a mechanical damage. The operation of the electric igniter illustrated in FIG. 1 may be effected with a direct voltage and without a high voltage generator. A difference of a glow plug to a conventionally used glow filament for flashpoint determination tests may be e.g. the encapsulation. Thus, the size of the outer surface and the constitution (or quality) of the outer surface may be significantly different. The glow plug used according to an embodiment of the present invention may require a mode of operation that is different from a conventionally used electric igniter. For example, a pulsating high voltage of ca. 1 kV may be required for a spark-generating ignition plug, whereas the glow plug may not need to be pulsed and an operation may be effected with usual power supply voltage (or line voltage). According to an embodiment of the present invention, a voltage of e.g. between 5 V and 10 V, in particular between 7.5 V and 8.5 V, may be applied to the ends of the wire of the electric igniter, in order to bring the glow plug to be glowing. The material of the tip may be ceramic, the shape of the tip may be rod-shaped and may comprise a homogeneous material. The temperature of the tip may amount e.g. to between 1000° C. and 1500° C. during an ignition operation.

Figure 6:
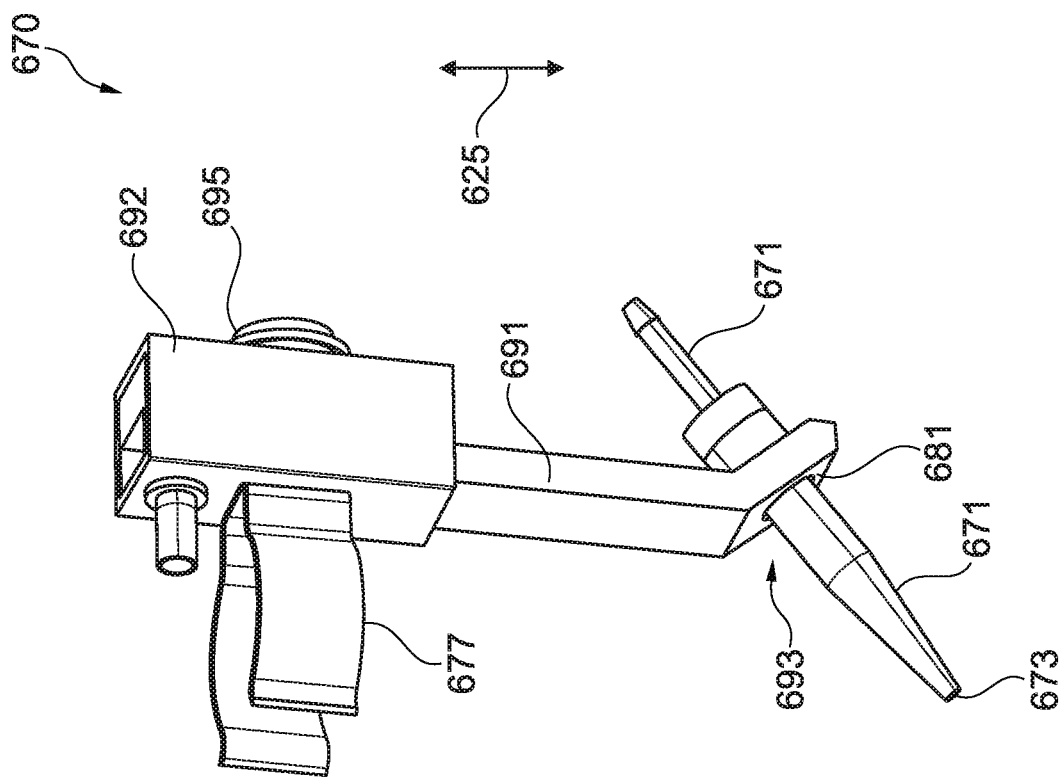
FIG. 5 and FIG. 6 illustrate gas supply devices according to further embodiments of the present invention.
Figure 5:
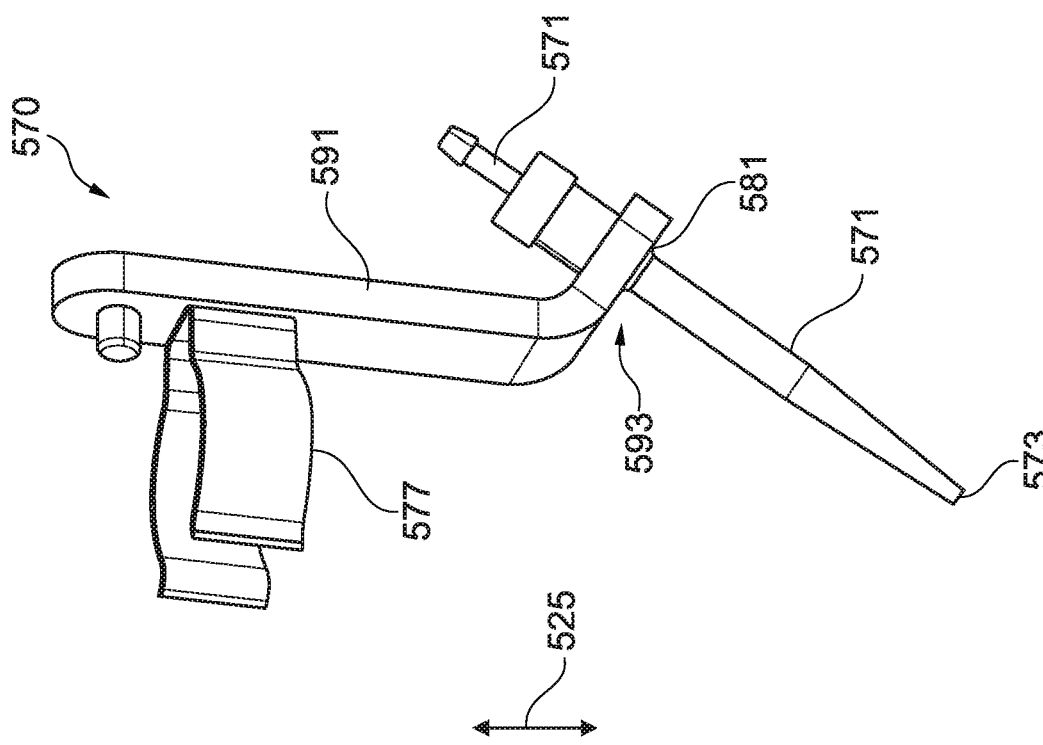

FIGS. 5 and 6 illustrate gas supply devices 570 and/or 670 according to further embodiments of the present invention, which may be conceived e.g. for the device 129 or 329 instead of the gas supply device 370.

In contrast to the gas supply device 370 illustrated in FIG. 3, the gas supply devices 570 and/or 670 each may have a retaining arm 591 and/or 691, which may extend substantially vertical (and in particular parallel to the electric igniter, if mounted to the electric igniter), which may be attached in an upper section to the fixation means, in particular the clamp 577 and/or 677, and which may have at a lower end a bent region or bending (from the vertical 525 and/or 625) 593 and/or 693 the passage openings 581 and/or 681, through which the gas supply line 571 and/or 671 may be guided and may be fixed therein. Due to the bending 593 and/or 693, the gas supply line may be formed to extend rectilinearly.

While the retaining arm 591 illustrated in FIG. 5 may be mounted fixedly to the clamp 577, the retaining arm 691 illustrated in FIG. 6 may be slidable in the vertical direction 625 relative to the clamp 677. To this end, a sheathing 692 (having a rectangular cross-section) may be mounted to the clamp 677, into which sheathing the retaining arm (having a rectangular cross-section) may be inserted and may be slidable therein, in order to enable adjusting the (vertical) position of the gas outlet opening 673, in particular positioning it underneath the ignition tip of the electric igniter. If the correct position is adjusted, the retaining arm may be secured by a clamping screw 695.

The electric igniter may be used for igniting a liquid-gas-mixture of a sample to be investigated (in the case of a desired electric ignition) as well as for igniting a gas, which in turn may be used for igniting the liquid-gas-mixture of the sample to be investigated (during a gas ignition). The electric igniter, in particular the glow plug, may be screw-fastened in a mechanical mounting (e.g. electric igniter mounting 157, 257, 357). An encapsulated plug for voltage supply may be built in the housing of the device, such that open cables that may be accessible for a user may be avoided. The gas line mounting 379 may also be referred to as an adapter, which may allow to clamp a gas supply line to the mounting of the glow plug, e.g. by a clamp. By a pin arranged in the adapter, the gas supply line and/or in particular a gas outlet opening may be correctly positioned at the bore that may be provided for this purpose in the electric igniter mounting. Prior to and during the measurement, the igniting of the gas by the electric igniter may ensure that a gas flame is present for each immersion process. The immersion depth of the electric igniter mounting including the gas ignition adapter may be adapted electronically such that the igniting of the samples may be guaranteed by the gas flame and not by the hot ignition tip of the electric igniter.

In contrast to conventional methods, the electric igniter may be moved linearly and/or rectilinearly into the crucible (i.e. the tip is moved downwardly from the upside into the crucible without tilt of the igniter). By the rectilinear operation, in particular the rectilinear and/or translational traversing movement of the electric igniter, a manual changeover of the ignition types may be facilitated. According to an embodiment of the present invention, the electric igniter may remain incorporated and fixed fixedly in the electric igniter mounting, also when the gas supply device and/or the gas supply line may be mounted to the electric igniter mounting (in particular by a clamp). The correct immersion depth of the respective ignition source may be adapted and controlled electronically by the selection of the ignition type.

The use of an encapsulated electric igniter, in particular a glow plug, may have different advantages: By encapsulating the heated coiled filament, the size of the surface and the quality (or nature) of the glow plug may be significantly more advantageous for the operation as an electric igniter than the conventional open metallic wire spiral. Possible significant improvement of the stability and resistance against mechanical load, e.g. in the case of a rough touching by other objects or a falling to the ground during a changeover the ignition type. The conventionally used open (unprotected) spiral may be deformed completely as result of a mechanical shock, and thus may become unusable.

An operation with direct and/or alternating voltage may enabled, wherein no high voltage generator is necessary. A mechanical stability of the immersion mechanism during operation as an igniter may be ensured, because the glow plug may be inserted into the crucible by the rectilinear movement without rotation. A significantly improved operation safety may be achieved by placing the cables in an area of the interior of the housing that may not be accessible for the user. A significant facilitation (or ease) of the changeover of the desired ignition type may be achieved, wherein no exchange of the electric igniter to a gas igniter may be required. Instead, the gas igniter may be mountable to the mounting of the glow plug via an adapter.

The invention claimed is:

1. A device for igniting a sample arranged in a container in a flashpoint determination test system and/or a combustion point determination test system, the device comprising:
    an electric igniter, which has an ignition tip having a partially or completely encapsulated electric wire; and
    a traversing device, which is configured for traversing the ignition tip of the electric igniter from above the container to a defined position within the container.

2. The device according to claim 1, wherein the electric wire is encapsulated such that a sample in a liquid and/or in a gaseous state does not directly contact the wire.

3. The device according to claim 1, wherein the traversing device is configured to traverse the ignition tip of the electric igniter along a rectilinear traverse distance, which extends substantially vertically or encloses an acute angle to the vertical.

4. The device according to claim 1, wherein the traversing device further has an electric motor with a crank drive, which crank drive is coupled to the electric igniter.

5. The device according to claim 1, wherein the traversing device has an electric igniter mounting, by which the electric igniter is mountable and the wire is electrically connectable and is encapsulated by a housing.

6. The device according to claim 1, wherein the traversing device has a sleeve-shaped guide having a guide opening that is defined by parallel internal walls, through which opening at least a part of the electric igniter mounting and/or at least a part of the electric igniter is passed through, wherein an outer surface of a part of the electric igniter mounting and/or a part of the electric igniter slides along at the parallel internal walls of the guide when traversing of the electric igniter.

7. The device according to claim 1, further comprising:
    a gas supply device having a gas supply line having a gas outlet opening, wherein the gas supply line is removably mountable offset to a longitudinal direction of the electric igniter, wherein the gas supply line is synchronously traversed together upon a traversing of the ignition tip of the electric igniter by the traversing device,
    wherein the traversing device is configured to traverse the gas outlet opening to a defined position within the container.

8. The device according to claim 7, wherein the gas outlet opening of the gas supply device is arranged underneath the ignition tip of the electric igniter along the longitudinal direction of the electric igniter such that a gas that exits from the gas outlet opening is ignitable by operating the electric igniter.

9. The device according to claim 7, wherein the gas supply line has a bend that is formed such that the gas outlet opening is arranged along the longitudinal direction of the electric igniter, and that a gas that exits from the gas outlet opening is ignitable by operating the electric igniter.

10. The device according to claim 7, wherein the gas supply device is configured to be able to be used as an ignition in a flashpoint determination test and/or a combustion point determination test without changing the electric igniter in respect of its position or orientation.

11. The device according to claim 7, wherein a gas supply line mounting is provided for removably mounting the gas supply line, which mounting
    has a cylindrical, passage opening, through which the gas supply line is guided and fixable by a clamping screw, and which mounting
    has fixation means with a clamp and/or a clip configured to fix at least partially elastically and/or by a screw and/or magnetically the gas supply device to a part of the electric igniter and/or of the electric igniter mounting;
    wherein the passage opening, within which the gas supply line is fixed, is provided at a bent end of a retaining arm that extends substantially vertically and that is mounted vertically adjustably to the fixation means.

12. The device according to claim 7, wherein furthermore a magnet is provided, to which a magnetic attractive force is applied by a magnet or magnetizable material fixed to a part of the electric igniter and/or the electric igniter mounting, in order to achieve a defined vertical positioning of the gas outlet opening relative to the ignition tip.

13. The device according to claim 7, wherein the traversing device is configured to traverse the electric igniter downwardly selectively by a first traverse distance or a second traverse distance, in order to move either the ignition tip of the electric igniter or, in the case of a mounted gas supply line, the gas outlet opening to the respectively defined position.

14. The device according to claim 1, wherein furthermore a pin is provided, which is pluggable through a passage opening of the clamp and into a hole of the electric igniter and/or the electric igniter mounting, in order to achieve a defined vertical positioning of the gas outlet opening relative to the ignition tip.

15. The device according to claim 1, wherein the electric igniter is configured as a glow plug.

16. The device according to claim 1, wherein the ignition tip has a sleeve that is made of metal and/or ceramics and that is closed at a front end, in a hollow space of which sleeve, in a front region, a coiled glow filament is arranged.

17. The device according to claim 16, wherein the electric igniter further has, in the hollow space in a rear region, a coiled regulation filament having a resistance that rises with the temperature, which filament is electrically connected to the coiled glow filament.

18. The device according to claim 1, wherein the device further has:
a driver module, which is configured and connected to apply a direct voltage between the ends of the wire of the electric igniter in order to guide an electric direct current between 5 Ampere and 15 Ampere through the coiled glow filament.

19. A system for a flashpoint determination and also for a combustion point determination, the system comprising:
a container for receiving a sample to be investigated;
a lid for closing the container, wherein the lid has a closable lid opening;
a temperature-control device for heating the sample with a defined heating rate and/or to a defined temperature; and
a device for igniting the sample arranged in the container, the device comprising an electric igniter with an ignition tip having a completely encapsulated electric wire and a traversing device, which is configured for traversing the ignition tip of the electric igniter from above the container to a defined position within the container;
wherein in the case of a lid being present the device for igniting is arranged such that, upon a traversing of the ignition tip of the electric igniter to the defined position within the container, the ignition tip is guided through the lid opening.

20. A method for igniting of a sample arranged in a container in a flashpoint determination test system and/or a combustion point determination test system, the method comprising:
traversing an ignition tip of an electric igniter, or a gas outlet opening of a gas supply line coupled to the electric igniter, from above the container to a defined position within the container,
wherein the electric igniter has an ignition tip having a completely encapsulated electric wire; and
igniting the sample in the container.

* * * * *